United States Patent

Granqvist

[15] 3,680,101

[45] July 25, 1972

[54] DISTANCE MEASURING DEVICE

[72] Inventor: Carl-Erik Granqvist, Lidingo, Sweden

[73] Assignee: AGA Aktiebolag, Lidingo, Sweden

[22] Filed: Aug. 10, 1970

[21] Appl. No.: 62,548

[30] Foreign Application Priority Data

Aug. 11, 1969 Sweden.................................11120/69

[52] U.S. Cl. .............................................343/14, 343/12 R
[51] Int. Cl. ..........................................................G01s 9/24
[58] Field of Search..........................................343/12 R, 14

[56] References Cited

UNITED STATES PATENTS 3,200,399   8/1965   Schneider et al.......................343/12 R
3,333,264   7/1967   Knepper................................343/12 R Primary Examiner—Benjamin A. Borchelt
Assistant Examiner—H. A. Birmiel
Attorney—Larson, Taylor & Hinds

[57] ABSTRACT

A distance measuring device wherein the phase difference between a transmitted signal and the received reflection thereof is used to determine the distance the received signal has traversed. The device generates a pair of electromagnetic waves at two accurately known frequencies. The first frequency wave is transmitted and the other frequency wave is used to modulate the received reflected wave in the receiver to produce a difference frequency. A phase measuring circuit compares the phase of this difference frequency to the phase of a signal of the same difference frequency that has been generated locally within the device. To resolve the ambiguity in the resulting phase difference measurement obtained, a switching means is provided to reverse the roles of the generated waves by connecting the second frequency wave to the transmitter and connecting the first frequency wave to the modulatable receiver. This same switching means also changes the phase measuring circuit so that the phase difference associated with the modulated received second frequency is subtracted from the first phase difference. By providing a phase difference measurement at a difference frequency having an associated effective wave length larger than the distance to be measured any ambiguity regarding the number of wavelengths contained in the measured distance is eliminated.

8 Claims, 1 Drawing Figure

United States Patent
Granqvist
[15] 3,680,101
[45] July 25, 1972
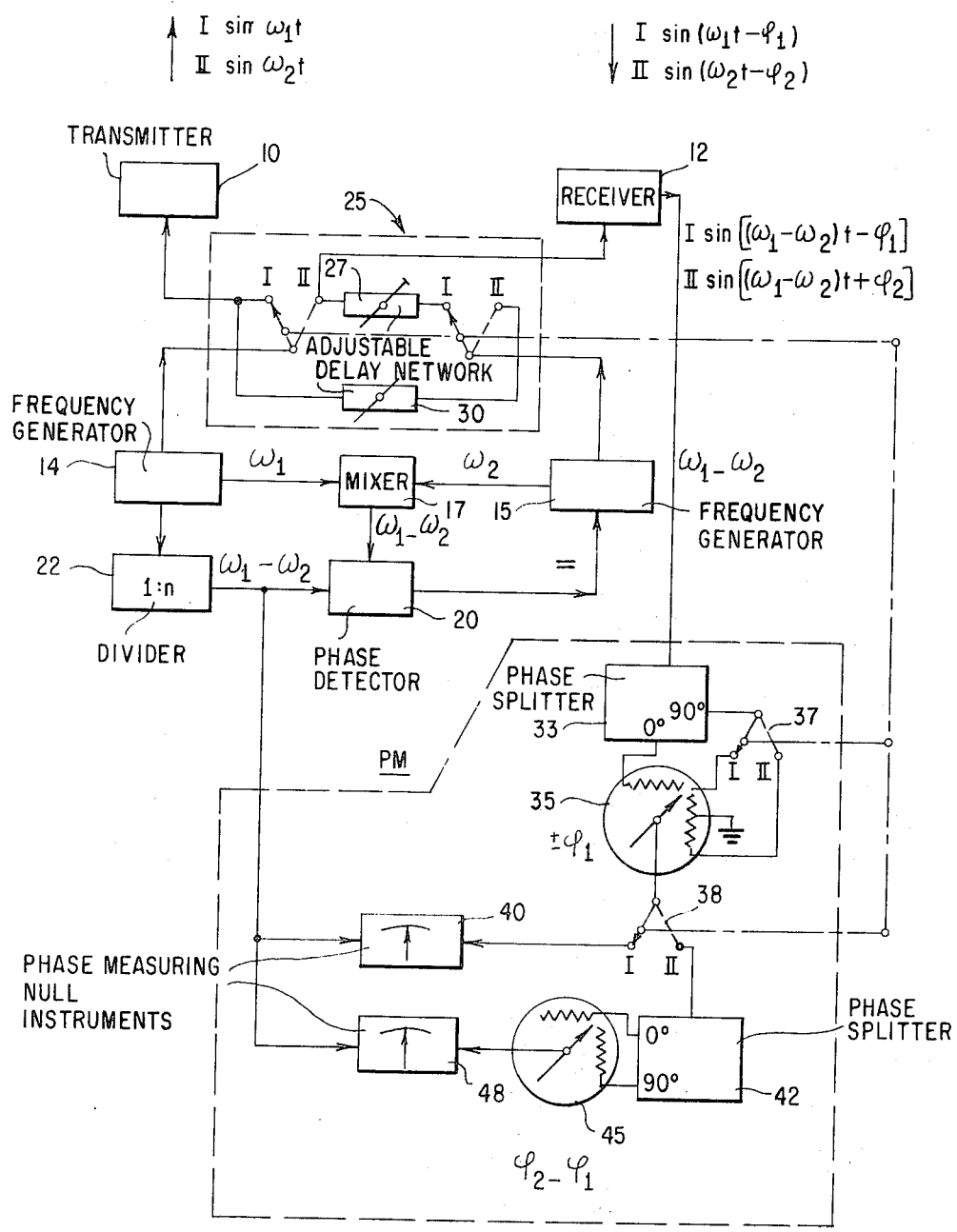

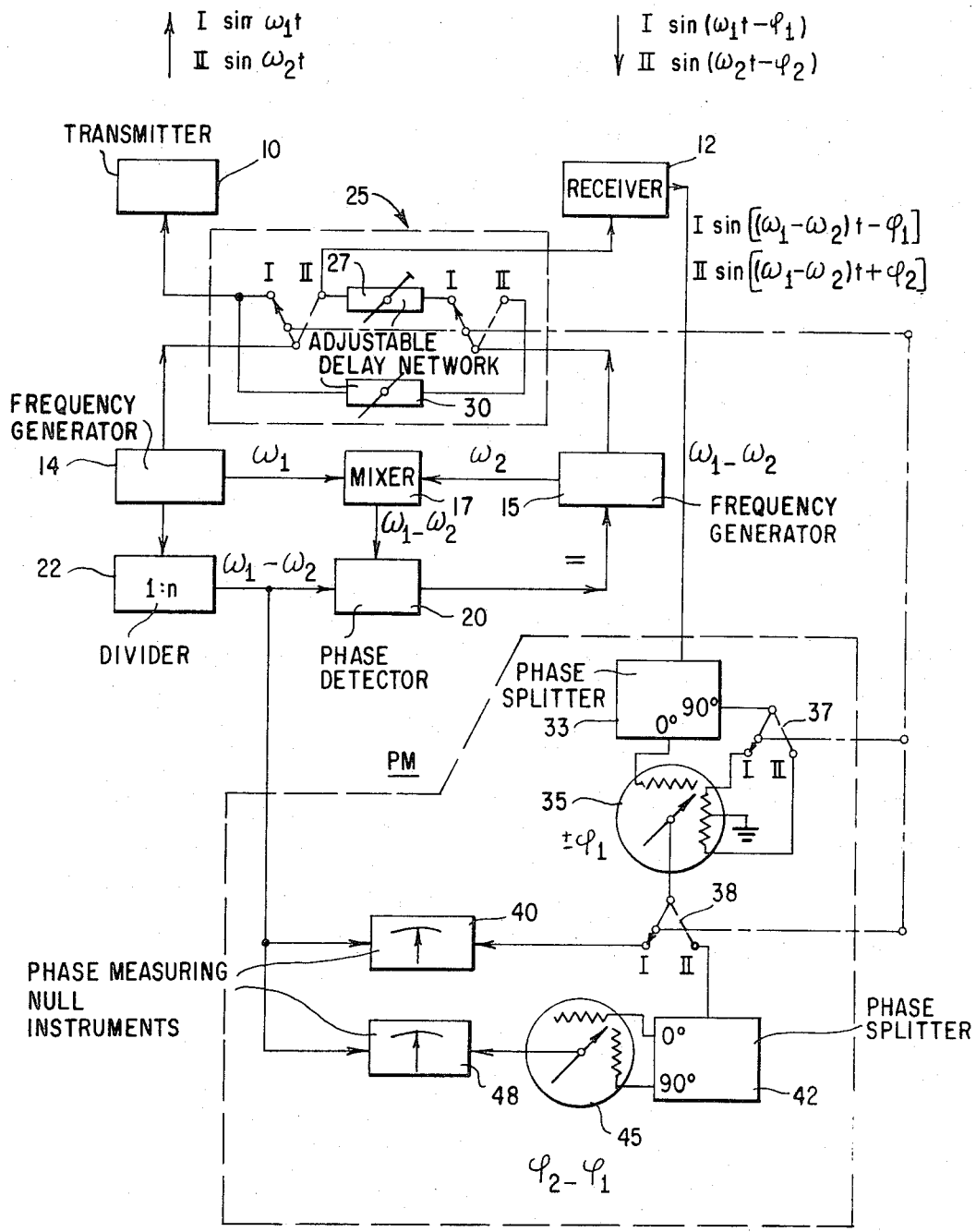

DISTANCE MEASURING DEVICE

FIELD OF THE INVENTION

This invention relates to distance measuring instruments of the type wherein distance is determined by measuring the phase difference between a transmitted electromagnetic wave and its received reflection.

BACKGROUND OF THE INVENTION

A common form of distance measuring devices utilizes the phase difference between a transmitted electromagnetic wave and its received reflection from a distant object to determine the distance to that object. This type of measurement, however, produces an ambiguous result. The ambiguity arises from the fact that for any given distance greater than two wavelengths of the transmitted wave there will be an integral number of wavelengths producing that same phase difference. To resolve this ambiguity the practice has been to transmit two electromagnetic waves of different frequencies, subtract the phase difference of one received reflected wave from the phase difference of the other received reflected wave and determine the distance measurement at a frequency corresponding to the difference in frequency between the two waves.

The transmission of two waves and obtaining their respective phase shifts has in the past required elaborate rearrangement of the equipment and/or has required additional calculations before the desired distance could be obtained.

SUMMARY OF THE INVENTION

The present invention seeks to overcome the disadvantages of the prior art discussed above by providing a single instrument for obtaining the requisite distance measurement in a simple manner without requiring elaborate rearrangement of the instrument or additional computational work. The invention utilizes at least two frequency generators that produce two signals whose frequencies are selected so that when these frequencies are heterodyned, a relatively low frequency difference is obtained. By interchangingly transmitting a wave of one frequency and heterodyning the received reflected wave with a second frequency wave, phase differences, each corresponding to the particular transmitted frequency wave, are determined at the same difference frequency. These phase differences are electronically subtracted to yield a phase shift for a wave at the difference frequency having a wavelength that is longer than the requisite distance and thus eliminating any ambiguity.

In a preferred embodiment of the invention, a modulatable transmitter and a modulatable receiver are provided with a switching means for first connecting the output of a first frequency generator to the transmitter and the output of a second frequency generator to the receiver for heterodyning the received reflection of the first frequency wave, and for then connecting the output of the second frequency generator to the transmitter and output of the first frequency generator to the receiver for heterodyning the received reflection of the second frequency wave. A phase measuring circuit is provided for comparing the phase of the difference frequency signal produced in the modulatable receiver with the phase of a difference frequency signal that is produced within the device by dividing down the output of one of the frequency generators. A switching means in the phase measuring circuit responds to the aforementioned switching mechanism and provides for the reversing of a reversible phase delay means and the coupling of this reversible phase delay means to a second phase delay means for providing the electronic subtraction of the phase differences.

DESCRIPTION OF THE DRAWING

The single FIGURE in the drawing is a schematic block diagram of a distance measuring instrument in accordance with a presently preferred embodiment.

DESCRIPTION OF A PREFERRED EMBODIMENT

The instrument comprises a modulatable transmitter 10, which transmits a beam of modulated electromagnetic radiation over the distance to be measured, as well as a modulatable receiver 12 adapted to receive a returning beam reflected at the far end. The instrument also comprises a first generator 14 generating a first frequency $\omega_1$, and a second generator 15 generating a second frequency $\omega_2$. Also provided in the instrument is a mixer 17 having the frequencies $\omega_1$ and $\omega_2$ applied thereto from the generators 14 and 15 and heterodyning these two frequencies to obtain the difference frequency $\omega_1 - \omega_2$, which is supplied to a phase detector 20. Since all the frequencies must have the highest degree of accuracy, the simplest way of achieving this is to provide one high precision frequency generator 14 and to divide down the frequency thereof in a frequency divider 22 by a factor of $n$ to obtain $\omega_1 - \omega_2$. Phase detector 20 compares the divided-down frequency with the heterodyned frequency from the mixer 17 to derive a control voltage for oscillator 15, which is thereby phase-locked to the high precision frequency generator 14 without having to be of the same high precision.

Interposed between the generators and the transmitter and the receiver is a switching means 25 having first and second positions I and II, respectively. In position I, generator 14 is connected to transmitter 10 for modulating the same, and generator 15, via an adjustable delay means 27, to receiver 12 for modulating it. In position II, generator 14 is connected to receiver 12 and generator 15, via a similar delay means 30, to transmitter 10.

Also provided is a phase-measuring circuit PM, which is responsive to the difference frequency $\omega_1 - \omega_2$ from frequency divider 22 and from receiver 12. As shown, circuit PM comprises a first phase splitter 33 connected between receiver 12 and a reversible phase delay means in the form of a resolver 35. Phase splitter 33 derives from its input signal a pair of outputs having 0° and 90° phase delays and which are supplied to stator windings of resolver 35 in a well known manner. One of the stator windings has a pair of balanced inputs connected to the 90° output of phase splitter 33 via a switch 37 having first and second positions I and II corresponding to those of switching means 25 and serving as a mans for changing the polarity of the 90° output voltage.

The rotor of resolver 35 is connected to a further switch 38 also having first and second positions I and II, respectively. The switches 25, 37 and 38 are ganged for simultaneous operation, as indicated by the dash-dot line. In the first position of switch 38, the rotor of resolver 35 is connected to one input of a phase-measuring null instrument 40, the other input of which has applied thereto the difference frequency $\omega_1 - \omega_2$ from frequency divider 22. In the other position of switch 38, the rotor is connected to the input of a second phase splitter 42 providing 0° and 90° output voltages to the stator windings of an additional phase delay means comprising a resolver 45. The rotor of resolver 45 is connected to one input of a second phase-measuring null instrument 48, whose other input also has applied thereto the difference frequency $\omega_1 - \omega_2$ from frequency divider 22.

Considering the operation of the system, with the switches in position I, the received signal is of the form $$\sin(\omega_1 t + \alpha - \phi_1) \tag{1}$$

where $$\phi_1 = \omega_1 L/c \tag{2}$$

As a result of the modulation of the receiver, we obtain $$\sin[(\omega_1 - \omega_2)t + \alpha - \beta - \phi_1] \tag{3}$$

where $\alpha$ and $\beta$ are inherent phase delays of the instrument,
$L$ is the distance the wave traversed,
$c$ the velocity of light, and
$\phi_1$ the phase delay corresponding to $L$.

With the switch in position II, the following expression is obtained for the signal received by receiver 12:

$$\sin(\omega_2 + \gamma - \phi_2) \qquad (4)$$

where $$\phi_2 = \omega_2 L/c \qquad (5)$$

The difference frequency signal created in the receiver is now of the form:

$$\sin(\omega_1 - \omega_2)t + \delta - \gamma + \phi_2 \qquad (6)$$

where $\gamma$ and $\delta$ are inherent delays.

A comparison of Equations (3) and (6) shows that the difference frequency output from the receiver has a negative phase angle proportional to the distance when the switch is in position I and a positive phase angle in position II. There is therefore a phase difference between position I and position II, which is a measure of the distance $L$.

Calibration of the instrument can be performed by applying the transmitter signal to the receiver via a calibration signal path. By suitable adjustment of delay means 27 and 30 when the calibration path is in operation, the following condition can be fulfilled:

$$\alpha - \beta = \gamma - \delta = 0 \qquad (7)$$

If this condition is met, the change in phase from position I to position II is:

$$\phi_1 - \phi_2 = (\omega_1 - \omega_2)L/c \qquad (8)$$

It is seen from Equation (8) that a measurement of the phase change is equivalent to measuring $L$ at the difference frequency $\omega_1 - \omega_2$.

The measurement in position I consists in adjustment of resolver 12 until null instrument 40 reads zero. This means that the delay in resolver 35 is equal in magnitude and opposite in polarity to the delay of the signal path, i.e. the value of this delay is $\phi_1$.

In position II, the delay in resolver 12 changes in polarity and now has the value $-\phi_1$ The resolver 35 output now is applied to resolver 45, which is adjusted until null instrument 48 reads zero showing that the two inputs thereto are of equal phase. When this is the case, the total delay in both resolvers 35 and 45 has the value $-\phi_2$, and since the delay in the first resolver 35 has the value $-\phi_1$, the delay of the second resolver 45 has the value $-\phi_2 + \phi_1 = -(\phi_2 - \phi_1)$.

It is seen, therefore, that the measurement in position I yields a phase delay $-\phi_1$ corresponding to the distance in terms of wavelengths at the first frequency $\omega_1$ and the measurement in position II yields a second value corresponding to the difference frequency, which makes it possible to resolve the ambiguity of the first measurement, it being assumed that the wavelength corresponding to the frequency $\omega_1 - \omega_2$ is long enough to leave no uncertainty with regard to multiples of that wavelength.

Although the invention has been described in detail with respect to an exemplary embodiment thereof, it will be understood by those of ordinary skill in the art that variations and modifications may be effected within the scope and spirit of the invention.

I claim:

1. A distance measuring device of the type providing for the detection of the phase difference between a transmitted electromagnetic wave and the received reflection of said wave comprising: a modulatable transmitter; a modulatable receiver; a first frequency generator for producing an output of a first frequency; a second frequency generator for producing an output of a second frequency; a difference frequency producing means for producing a signal having a frequency equal to the frequency difference between said first and said second frequencies; a switching means for, in a first position, connecting the output from said first frequency generator to said modulatable transmitter to modulate the output thereof and connecting the output from said second frequency generator to said modulatable receiver to modulate the output thereof and for, in a second position, connecting the output from said second frequency generator to said modulatable transmitter to modulate the output thereof and connecting the output from said first frequency generator to said modulatable receiver to modulate the output thereof; and a phase measuring circuit responsive to the difference in phase between the output of said difference frequency producing means and the phase of the output of said modulatable receiver.

2. A distance measuring device in accordance with claim 1 wherein said phase measuring circuit comprises further switching means responsive to the first-mentioned switching means having first and second positions corresponding to the first and second positions of said first-mentioned switching means, said further switching means connecting the output of said modulatable receiver to the said phase measuring circuit such that the difference in phase between the output of said modulatable receiver in the first position of said first-mentioned switching means and the output of said modulatable receiver in the second position of said first-mentioned switching means can be determined by said phase measuring circuit.

3. A distance measuring device in accordance with claim 2 wherein said phase measuring circuit comprises phase delay means comprising a reversible phase delay device and a further phase delay device responsive to the output from said reversible phase delay device, said delay means producing an output corresponding to the difference between the phase of the output of said modulatable receiver for the first position of said first-mentioned switching means and the phase of the output of said modulatable receiver for said second position of said first-mentioned switching means.

4. A distance measuring device in accordance with claim 3 wherein said reversible phase delay device comprises a resolver connected to said further switching means such that the polarity of the output of said resolver for the first position of said further switching means is opposite to the polarity of the output of the resolver for the second position of said further switching means.

5. A distance measuring device according to claim 3, comprising a null instrument connected between said difference frequency producing means and said reversible phase delay device.

6. A distance measuring device in accordance with claim 5 comprising a further null instrument, connected between said difference frequency producing means and said further phase delay device.

7. A distance measuring device in accordance with claim 1 wherein said first generator comprises a high precision generator and said second generator comprises an oscillator for producing an output responsive to a control signal derived from said high precision generator.

8. A distance measuring device in accordance with claim 7 wherein the means for producing the control signal comprises a mixer for producing an output of a frequency corresponding to the difference in frequency between the output of said precision generator and the output of said oscillator; a frequency dividing means for producing the difference frequency from the output of said precision generator; and a means for comparing the output from said frequency dividing means with the output from said mixer.

* * * * *